United States Patent
Bang

(10) Patent No.: US 11,861,348 B2
(45) Date of Patent: Jan. 2, 2024

(54) SYSTEM AND METHOD FOR CONTROLLING AN UPDATE OF A VEHICLE CONTROLLER

(71) Applicants: HYUNDAI MOTOR COMPANY, Seoul (KR); KIA CORPORATION, Seoul (KR)

(72) Inventor: Soon Il Bang, Hwaseong-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 248 days.

(21) Appl. No.: 17/399,875

(22) Filed: Aug. 11, 2021

(65) Prior Publication Data
US 2022/0121436 A1    Apr. 21, 2022

(30) Foreign Application Priority Data

Oct. 16, 2020 (KR) .......................... 10-2020-0134499

(51) Int. Cl.
| | |
|---|---|
| *G06F 8/65* | (2018.01) |
| *B60L 58/12* | (2019.01) |
| *B60W 10/26* | (2006.01) |
| *B60W 50/04* | (2006.01) |
| *G07C 5/00* | (2006.01) |

(52) U.S. Cl.
CPC ................ *G06F 8/65* (2013.01); *B60L 58/12* (2019.02); *B60W 10/26* (2013.01); *B60W 50/04* (2013.01); *G07C 5/008* (2013.01); *B60W 2510/244* (2013.01); *B60W 2556/45* (2020.02)

(58) Field of Classification Search
None
See application file for complete search history.

(56) References Cited

U.S. PATENT DOCUMENTS

| | | | |
|---|---|---|---|
| 2013/0262067 A1 | 10/2013 | Zhang et al. | |
| 2015/0113521 A1* | 4/2015 | Suzuki | G06F 8/65 717/173 |
| 2018/0203683 A1* | 7/2018 | Kim | G06F 8/65 |
| 2020/0073653 A1 | 3/2020 | Jeong et al. | |
| 2020/0164763 A1 | 5/2020 | Holme | |
| 2020/0215930 A1 | 7/2020 | Izumi | |

OTHER PUBLICATIONS

European Search Report cited in European app No. 21 191 032.8; dated Feb. 1, 2022; 12 pp.

* cited by examiner

*Primary Examiner* — James J Lee
*Assistant Examiner* — Jonathan E Reinert
(74) *Attorney, Agent, or Firm* — LEMPIA SUMMERFIELD KATZ LLC

(57) ABSTRACT

An update control system and method of a vehicle controller are capable of determining whether a user's vehicle is being updated, based on a state-of-charge (SOC) change rate pattern indicating a degree of SOC change reduced while other vehicles are performing the corresponding update upon determining whether to perform an update using an OTA service. The system and the method re-extract a SOC change rate pattern by using a change in a SOC value measured at the beginning of an update in the corresponding vehicle to re-calculate a remaining SOC value. Thus, the success rate of a controller update using the OTA service and the update performance rate in which an actual update is in progress are increased.

14 Claims, 10 Drawing Sheets

SYSTEM AND METHOD FOR CONTROLLING AN UPDATE OF A VEHICLE CONTROLLER

CROSS-REFERENCE TO RELATED APPLICATION

This application claims the benefit of priority to Korean Patent Application No. 10-2020-0134499, filed in the Korean Intellectual Property Office on Oct. 16, 2020, the entire contents of which are incorporated herein by reference.

TECHNICAL FIELD

The present disclosure relates to an update control system and method of a vehicle controller, and more particularly, relates to an update control system and method of a vehicle controller capable of improving the performance and success rate of an update using an over-the-air (OTA) service.

BACKGROUND

Nowadays, an over-the-air (OTA) service is being used to transmit software (S/W), which controls various devices installed in a vehicle through a cloud server of an automobile company, configuration information, or tuning data to a customer's vehicle through a wireless communication network. Accordingly, it is possible to perform an update through the OTA service while the customer does not drive a vehicle to visit a repair shop.

As such, the constant power of a battery is consumed to update a vehicle controller by the OTA service. Accordingly, a central communication unit or communication control unit (CCU) of a vehicle may determine whether to proceed with an update by determining whether a state-of-charge (SOC) remaining amount of a battery maintained after the update is performed is in a state where a minimum vehicle function (starting, door unlocking, or the like) is capable of operating normally even when there is software to be updated.

In other words, when the update fails while the update using the OTA service is in progress, in particular, when the SOC remaining amount of the battery is insufficient, it may lead to fatal effects such as poor starting or non-operation of electric vehicle functions. Accordingly, upon conventionally calculating the remaining SOC after the update is completed to execute a stable OTA service, the remaining SOC used to be calculated by reflecting a considerable margin.

However, when an SOC does not meet such the margin due to poor battery conditions such as driving habits, battery aging, or the like upon calculating the SOC based on the maximum current consumption by reflecting such the considerable margin, a vehicle controller fails to be updated even though it is possible to update the vehicle controller. As a result, software provided to improve the marketability of a vehicle hinders the rapid application of a new solution to be implemented.

SUMMARY

The present disclosure has been made to solve the above-mentioned problems occurring in the prior art while advantages achieved by the prior art are maintained intact.

An aspect of the present disclosure provides an update control system and a method of a vehicle controller that applies new features provided by an automaker to improve the quality thereof and reliably and quickly provides the new functions to a customer, by stably securing the update success rate of a vehicle controller by OTA while the performance rate thereof is improved.

The technical problems to be solved by the present inventive concept are not limited to the aforementioned problems. Any other technical problems not mentioned herein should be clearly understood from the following description by those having ordinary skill in the art to which the present disclosure pertains.

According to an aspect of the present disclosure, an update system of a vehicle controller may include an over-the-air (OTA) management server providing a state-of-charge (SOC) change rate pattern of a group having vehicle information and battery information, which have similar types to each other, as an optimal pattern for calculating a remaining SOC value after an OTA update. The system may also include a CCU calculating an expected value of the remaining SOC value based on the SOC change rate pattern provided by the OTA management server, to determine whether to update a controller, and to update the controller.

In an embodiment of the present disclosure, the system may further include a battery sensor connected to a battery of a vehicle and configured to measure an SOC value of the battery changed upon updating the controller using an OTA service provided by the CCU and to transmit the measured SOC value to the CCU.

In an embodiment of the present disclosure, the OTA management server may include a vehicle information management device collecting and storing the vehicle information from the CCU provided in a vehicle. The OTA management server may also include a battery information management device collecting and storing information about a battery installed in each vehicle receiving the vehicle information. The OTA management server may also include a SOC change amount management device collecting a SOC value measured before and after an update of each controller by an OTA service in each vehicle receiving the battery information and deriving and storing a SOC change rate indicating a reduction degree of the SOC value.

In an embodiment of the present disclosure, the OTA management server may further include a SOC change rate grouping device integrally matching the SOC change rate with the vehicle information and the battery information when the controller is updated using the OTA service. The SOC change rate grouping device may also group together a vehicle information type and a battery information type, which indicate similar SOC change rate patterns to each other. The SOC change rate grouping device may also store the grouped result in a database.

In an embodiment of the present disclosure, the OTA management server may further include an optimal pattern suggesting device extracting, from the database, one group among groups belonging to an event having the highest similarity with an update event for updating controllers by using the OTA service. The optimal pattern may also provide the CCU with the SOC change rate pattern matched to the extracted one group as the optimal pattern that is a criterion for determining whether to start an update in the vehicle.

In an embodiment of the present disclosure, the CCU may include a SOC change rate pattern applying device that receives the SOC change rate pattern transmitted by the OTA management server. The SOC change rate pattern applying device may also calculate a SOC reduction degree until an update event is completed, depending on the SOC change rate pattern. The SOC change rate pattern applying device may also compare the calculated remaining SOC value with a reference SOC value and determine whether to perform an update.

In an embodiment of the present disclosure, the CCU may further include a SOC change monitoring device receiving, from a battery sensor, the SOC value measured before and after the update of each controller on the update event to be performed when it is determined to perform the update. The SOC change monitoring device may also transmit the SOC value to the OTA management server.

In an embodiment of the present disclosure, the CCU may further include an update continuation determining device re-calculating the SOC reduction degree until all the remaining controllers belonging to the update event are updated, through the received SOC change rate pattern as a new optimal pattern. The update continuation determining device may also compares a remaining SOC value obtained by re-calculating the SOC reduction degree with the reference SOC value again and determine whether to continue the update.

According to an aspect of the present disclosure, an update control method of a vehicle controller may include grouping vehicle information and battery information, which indicate similar SOC change rates to each other, when a controller is updated using an OTA service and storing the grouped result in a database of an OTA management server. The method may also include extracting a SOC change rate pattern of a group having the vehicle information and the battery information, which have similar types to each other, as an optimal pattern for calculating a SOC reduction expected value. The method may also include calculating, by a CCU of each vehicle receiving the SOC change rate pattern, a remaining SOC value after an update is completed, determining whether to update the controller, and proceeding with an update.

In another embodiment of the present disclosure, the grouping of the vehicle information and the battery information may include collecting the vehicle information from the CCU provided in each vehicle to store the vehicle information in the database. The grouping may also include collecting the battery information installed in each vehicle receiving the vehicle information. The grouping may also include accumulating and storing a SOC value for determining a consumption level of a battery, which has been consumed when the controller is updated using the OTA service in each vehicle receiving the battery information, collecting a SOC change rate changed over time, and storing the SOC change rate in the database.

In another embodiment of the present disclosure, the grouping of the vehicle information and the battery information may further include integrally matching the SOC change rate with the vehicle information and the battery information. The grouping may also include grouping together a vehicle information type and a battery information type, which indicate similar SOC change rate patterns to each other and storing the grouped result in the database.

In another embodiment of the present disclosure, the calculating of the remaining SOC value may include applying a current SOC value obtained from a battery sensor to the SOC change rate pattern received from the OTA management server, and calculating a remaining SOC value, which is an expected value to be reduced until an update event is completed. The calculating may also include comparing the calculated remaining SOC value with a reference SOC value to determine whether to perform the update.

In another embodiment of the present disclosure, the method may further include receiving, from a battery sensor, the SOC value measured before and after the update of each controller to transmit the SOC value to the OTA management server when it is determined, in the proceeding with the update, that the update is performed, and then updating each controller belonging to an update event.

In another embodiment of the present disclosure, the method may further include transmitting the SOC value before and after the update of each controller to the OTA server in the receiving of the SOC value measured before and after the update. The method may further include determining whether there is a controller to be updated. The method may further include determining whether to continue the update, depending on the SOC change rate pattern that is re-extracted based on an actual SOC change rate derived from the SOC value obtained in the receiving of the SOC value measured before and after the update.

In another embodiment of the present disclosure, the determining of whether to continue the update may include re-selecting a group indicating the SOC change rate most similar to the actual SOC change rate calculated based on the SOC value measured before and after the update of the controller in a corresponding event group with respect to a corresponding controller. The determining may also include presenting the SOC change rate pattern matched to the re-selected group as the optimal pattern for re-calculating an expected value of the remaining SOC value.

In another embodiment of the present disclosure, the determining of whether to continue the update may further include applying a SOC value after the update of the controller to the re-extracted SOC change rate pattern to re-calculate an expected value of the remaining SOC value when updates of the remaining controllers are completed. The determining may also include comparing the re-calculated remaining SOC value with a reference SOC value to determine whether to continue updating the remaining controllers.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
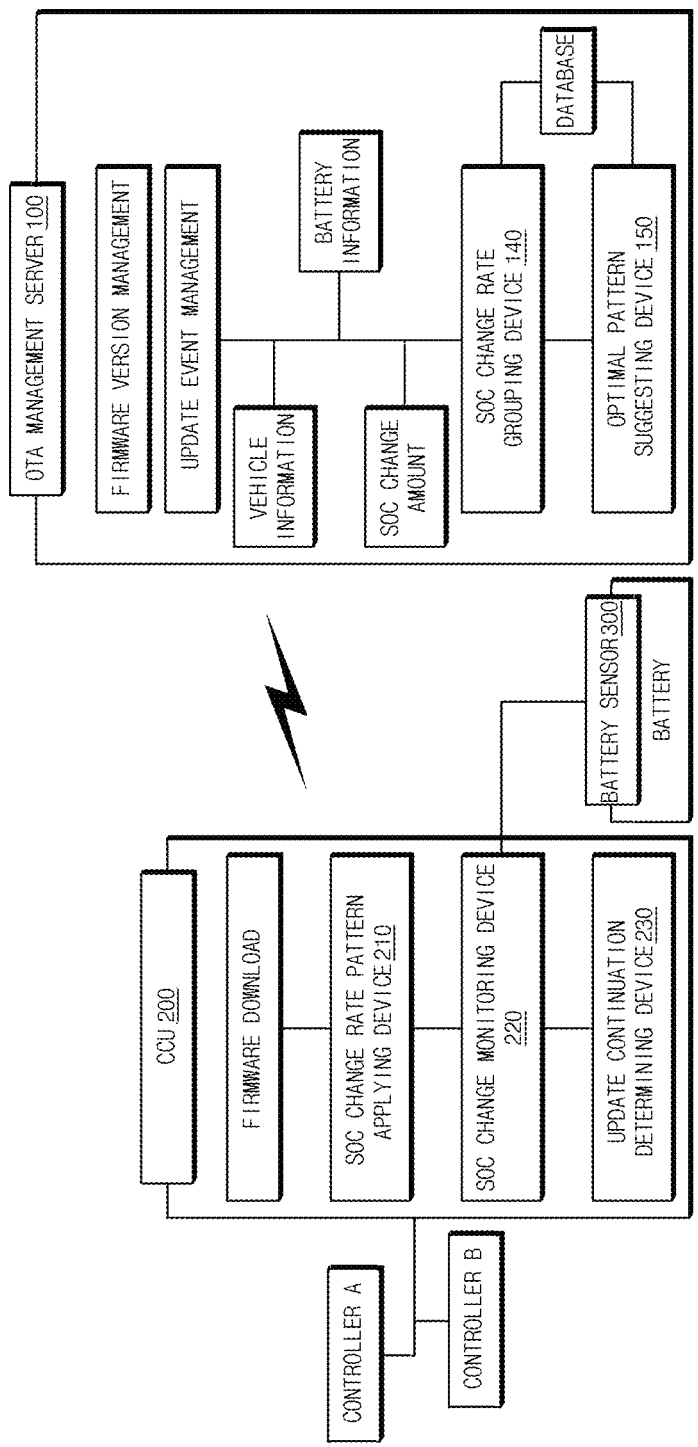
FIG. 1 is a block diagram illustrating an entire system for an update system of a vehicle controller according to an embodiment of the present disclosure.

Hereinafter, embodiments of the present disclosure are described in detail with reference to the accompanying drawings. In adding reference numerals to components of each drawing, it should be noted that the same or equivalent components have the same reference numerals, although they are indicated on another drawing. In describing the embodiments of the present disclosure, detailed descriptions associated with well-known functions or configurations have been omitted to avoid unnecessarily obscuring subject matter of the present disclosure.

In describing elements of embodiments of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein should be interpreted as is customary in the art to which the present disclosure belongs. It should be understood that terms used herein should be interpreted as having a meaning that is consistent with their meaning in the context of the present disclosure and the relevant art and should not be interpreted in an idealized or overly formal sense unless expressly so defined herein. When a component, device, element, or the like of the present disclosure is described as having a purpose or performing an operation, function, or the like, the component, device, or element should be considered herein as being "configured to" meet that purpose or to perform that operation or function.

Hereinafter, various embodiments of the present disclosure are described in detail with reference to FIGS. 1-8.

Figure 2:
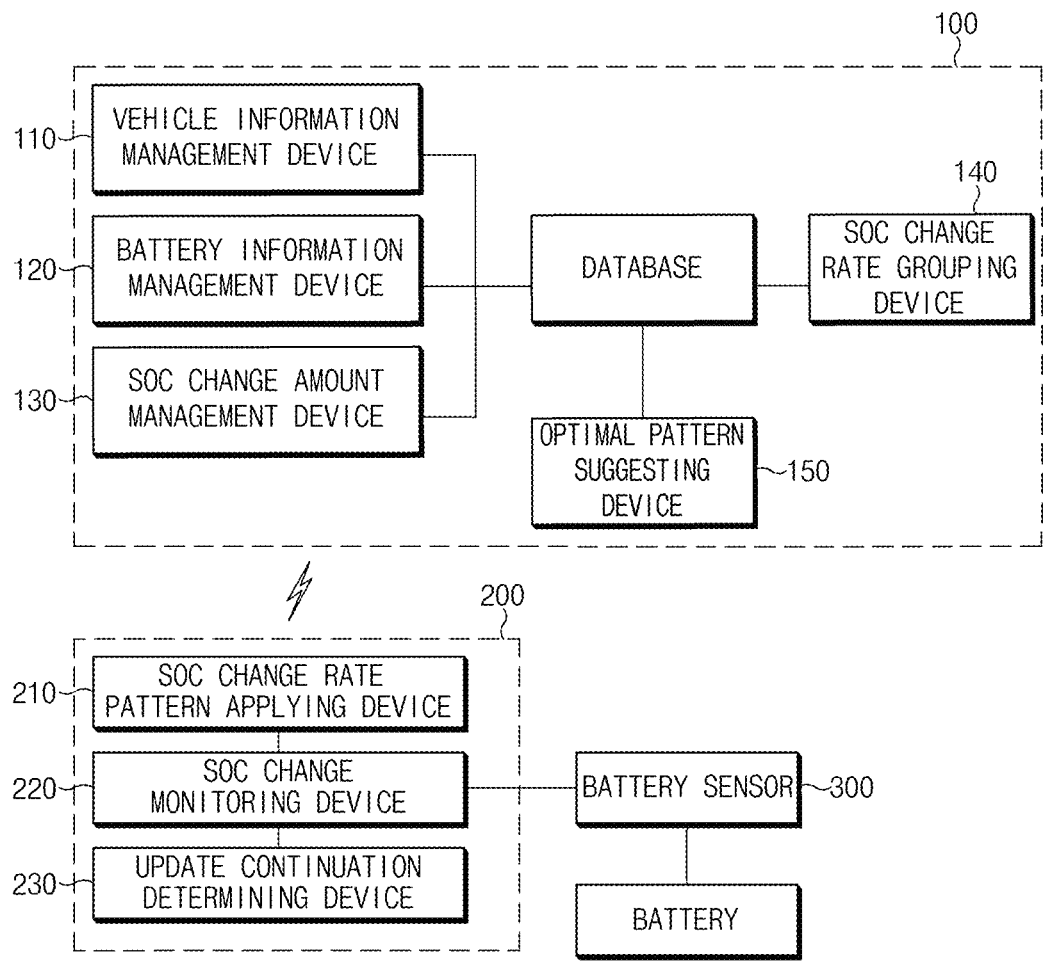
FIG. 2 is a block diagram of an update system of a vehicle controller according to an embodiment of the present disclosure.

FIG. 1 is a block diagram illustrating an entire system for an update system of a vehicle controller according to an embodiment of the present disclosure. FIG. 2 is a block diagram of an update system of a vehicle controller according to an embodiment of the present disclosure.

Referring to FIGS. 1 and 2, an update system of the vehicle controller according to an embodiment of the present disclosure may include an over-the-air (OTA) management server 100, a communication control unit (CCU) 200, and a battery sensor 300. The OTA management server 100 may collect vehicle information, battery information, and a state-of-charge (SOC) value changed when a controller in each vehicle is updated using an OTA service. The OTA management server 100 may also group the vehicle information and the battery information that indicate similar SOC change rates to each other. The OTA management server 100 may also extract a SOC change rate pattern of a group having a type similar to that of a vehicle to be updated and that of a battery mounted in the vehicle as an optimal pattern for calculating an expected value of a remaining SOC value. The CCU 200 may calculate the expected value of the remaining SOC value based on the SOC change rate pattern extracted from the OTA management server, may determine whether to update the controller, and may update the controller. The battery sensor 300 may be connected to the battery of the vehicle to measure an SOC value of the battery changed when the controller is updated and to transmit the measured SOC value of the battery to the CCU.

When new software (S/W) to be mounted on each of various controllers in a vehicle is received, the OTA management server 100 may store the new software (S/W) to manage the version of firmware (S/W). In order to simultaneously update a plurality of controllers by using the newly-received software (S/W) in a bundle, the OTA management server 100 may manage an update event for integrating updates of such the controllers in a bundle.

Figure 3:
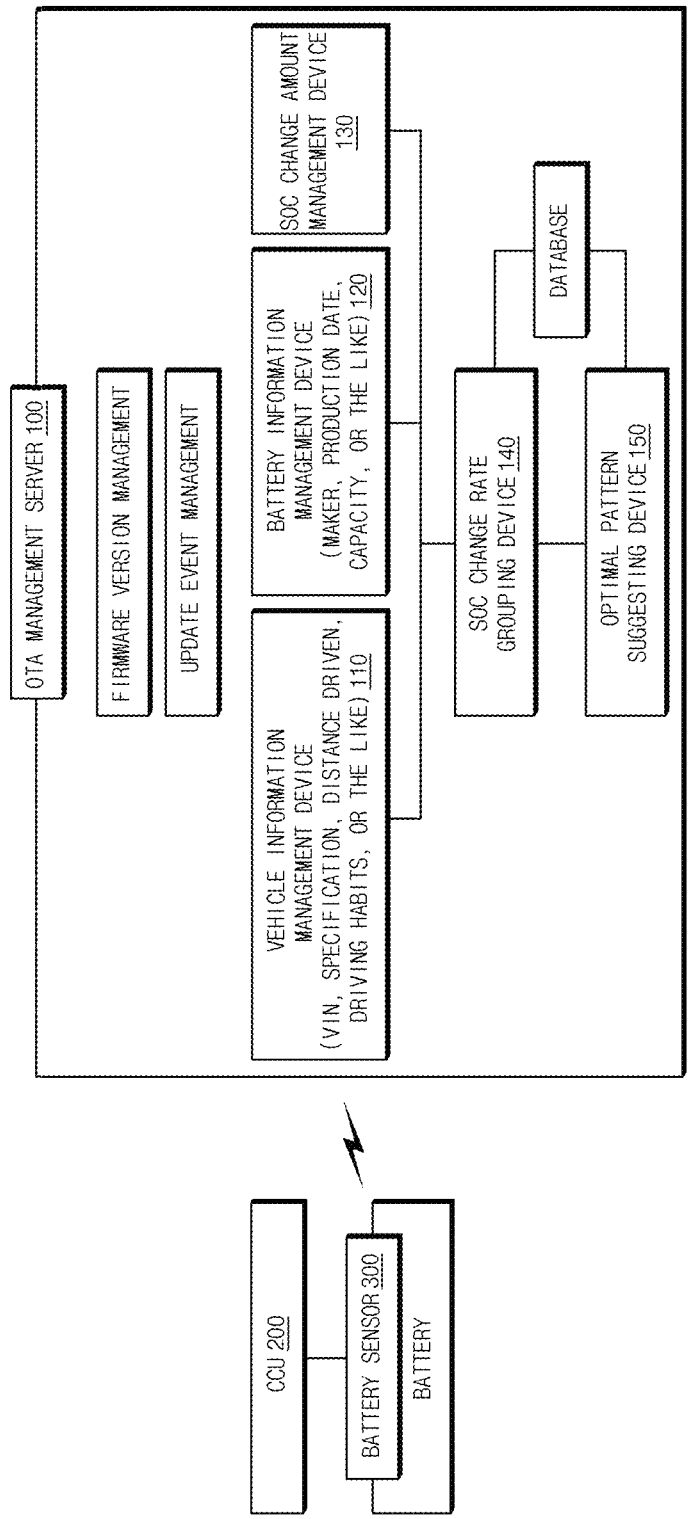
FIG. 3 is a detailed block diagram of an OTA management server according to an embodiment of the present disclosure.

Moreover, as illustrated in FIG. 3, the OTA management server 100 may include a vehicle information management device 110, a battery information management device 120, and an SOC change amount management device 130. The vehicle information management device 110 may collect and store vehicle information from the CCU 200 provided in each vehicle actually being driven. The battery information management device 120 may collect and store information about a battery installed in each vehicle that receives the vehicle information. The SOC change amount management device 130 may collect and store an SOC value for grasping the consumption degree of a battery consumed when a controller is updated by using the OTA service in each vehicle that receives the battery information.

At this time, as illustrated in FIG. 3, the vehicle information management device 110 may receive various pieces of information associated with a vehicle or driving, such as vehicle identification number (VIN) of each vehicle actually being driven on a road by users, a specification (option) of a controller applied to each vehicle, a distance driven of each vehicle, and driving habits from the CCU 200 provided in each vehicle. The vehicle information management device 110 may also store the various pieces of information in a database.

As such, in addition to obtaining and storing the VIN and the distance driven as data for determining whether a vehicle itself is aging, the vehicle information management device 110 may obtain and store a specification (option) of a controller installed in each vehicle and a user's driving habits (duration per trip or average number of trips per week) as data that affects battery consumption.

In other words, the user's driving habits, such as the duration per trip or the average number of trips per week may be an important factor affecting an actual SOC change because affecting the charging/discharging performance of a battery and battery aging.

As such, the vehicle information management device 110 may obtain and store data for determining whether each vehicle is aging and data capable of being a factor affecting battery consumption. Accordingly, when the SOC change amount management device 130 analyzes a SOC change amount stored in the database, the vehicle information management device 110 may easily group pieces of vehicle information of vehicles indicating similar SOC change patterns to one another.

Moreover, as illustrated in FIG. 3, the battery information management device 120 may receive various pieces of information associated with a battery such as a maker, a type (AGM or Flooded), a production date, or capacity of the battery installed in each vehicle from the CCU and then may store the various pieces of information in the database.

As such, the battery information management device 120 may obtain and store data for determining the basic performance of a battery itself and whether the battery is aging. Accordingly, when the SOC change amount management device 130 analyzes an SOC change amount stored in the database, the battery information management device 120 may easily group pieces of battery information indicating similar SOC change patterns.

Moreover, while the controller is being updated using the OTA service, the SOC change amount management device 130 may receive, from the CCU 200, the SOC value obtained through a battery sensor to store the SOC value cumulatively. The SOC change amount management device 130 may also generate and store a change graph indicating a degree of SOC reduced as each controller is being updated.

At this time, the SOC value received from the CCU 200 refers to a value measured by the battery sensor 300 while a controller is being updated using the OTA service in a state of constant power (B+) of a battery after a vehicle is turned off (KEY OFF).

As such, the SOC change amount management device 130 may generate the change graph composed of SOC values before and after the update and may derive a SOC change rate that occurs at a point in time when each controller is updated, by using the degree of change in the slope of the graph.

Figure 4A:
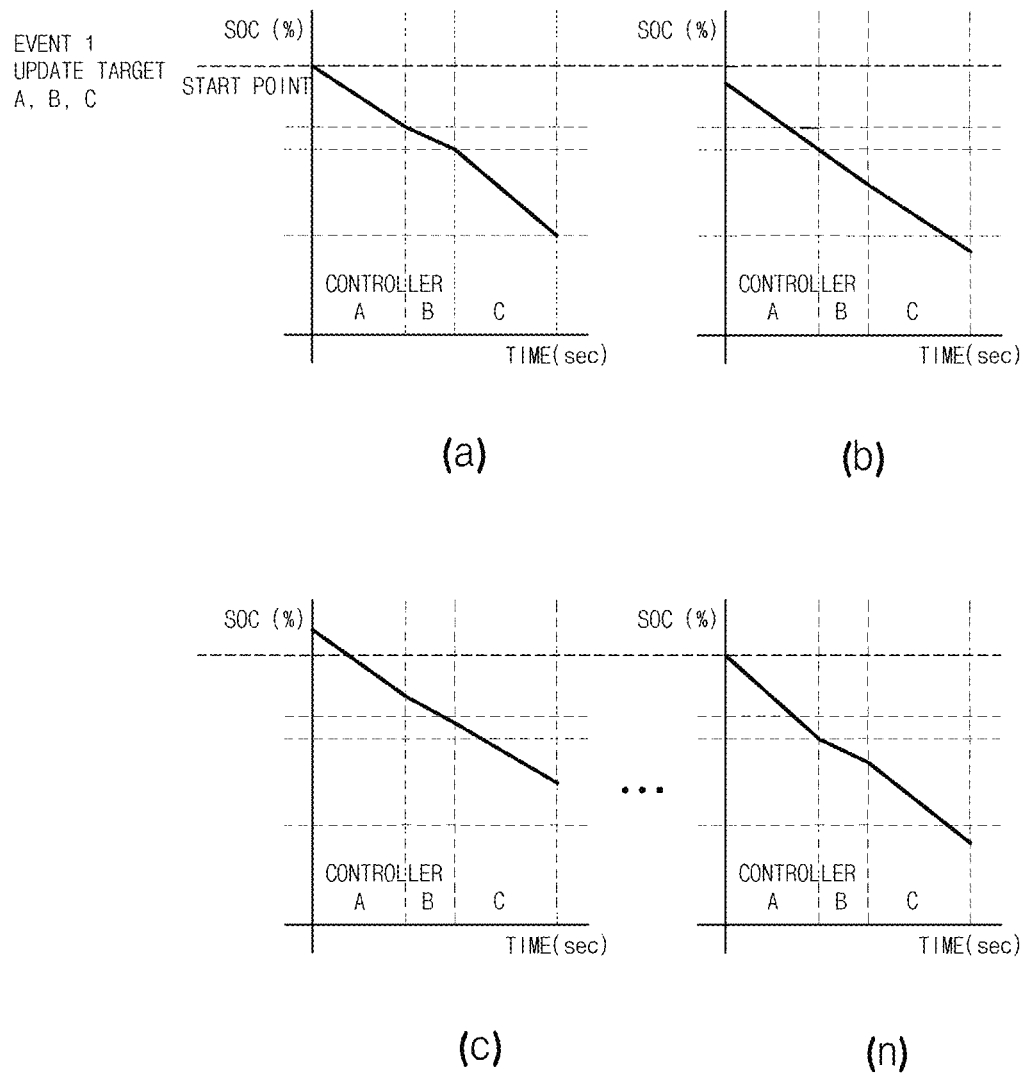
FIG. 4A, FIG. 4B, and FIG. 4C are diagrams of a SOC change graph according to an embodiment of the present disclosure.
Figure 4B:
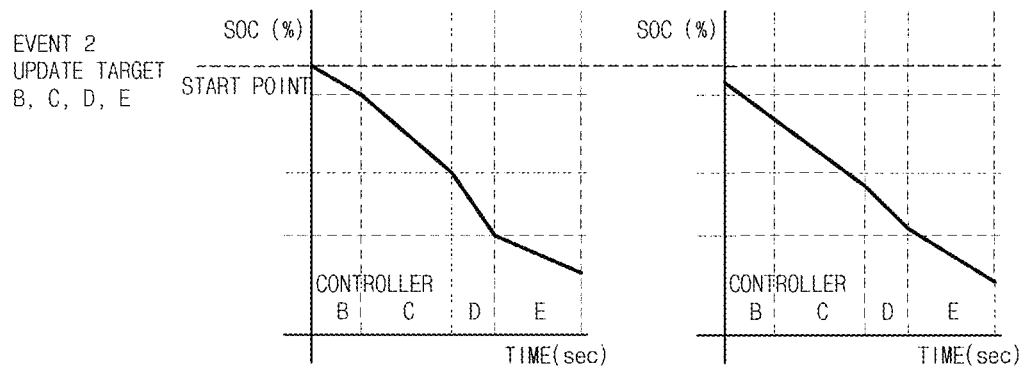
Figure 4B:
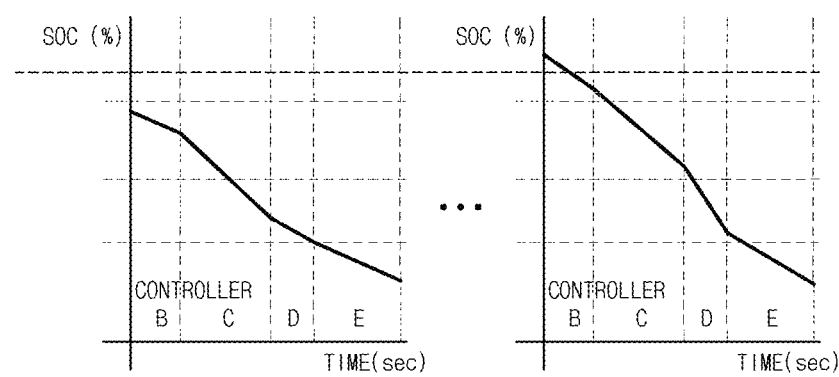
Figure 4C:
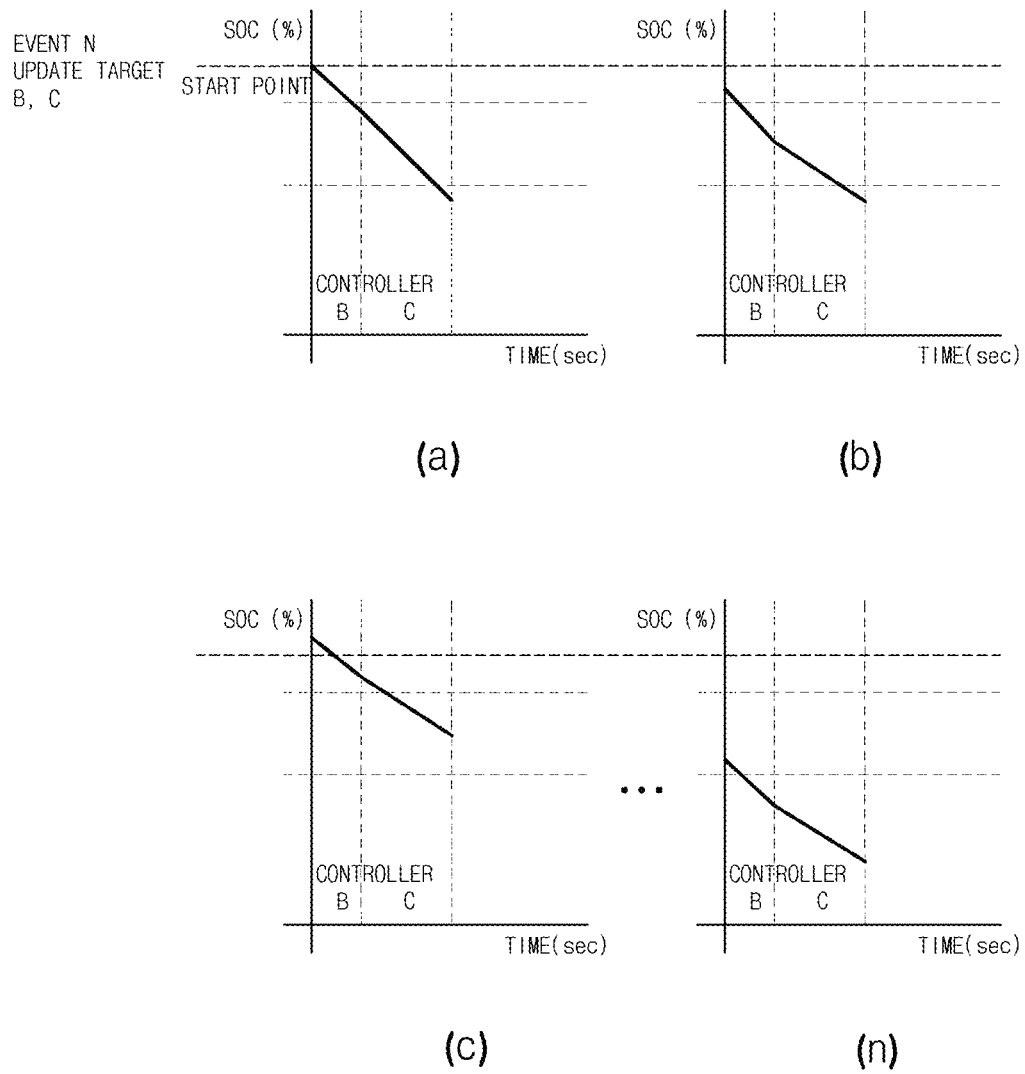

At this time, in addition to deriving the SOC change rate of each controller when an update using the OTA service is an update event in which a plurality of controllers are simultaneously updated in a bundle, as illustrated in FIG. 4A, FIG. 4B, and FIG. 4C, it is also possible to derive a continuous SOC change rate while all of the controllers included in the update event are sequentially updated.

In FIG. 4A, FIG. 4B, and FIG. 4C, in a case of event 1 in which controllers A, B, and C are updated, it is indicated that various SOC change rates are derived depending on a vehicle or an installed battery as illustrated in the drawings from (a) to (n). In a case of event 2 in which controllers B, C, D, and E are updated, and event 3 in which controllers B and C are updated, it is indicated that various SOC change rates are derived depending on a vehicle or an installed battery as illustrated in drawings from (a) to (n).

Also, the OTA management server 100 may further include a SOC change rate grouping device 140 that integrally matches the SOC change rate with vehicle information and battery information when a controller is updated using the OTA service, groups together a vehicle information type and a battery information type that indicate similar SOC change rate patterns, and stores the grouped result in a database.

The SOC change rate grouping device 140 may divide the vehicle information into a plurality of types (A1 type, A2 type, A3 type to An type, and the like) indicating identical or similar conditions to one another as contents (whether there is commonality such as a vehicle model, a vehicle year, a distance driven, a controller specification, a user's driving habits, and the like) and may store the divided result. Likewise, the SOC change rate grouping device 140 may divide the battery information into a plurality of types (B1 type, B2 type, B3 type to Bn type, and the like) having identical or similar conditions to one another as contents (whether there is commonality such as a maker, type, production date, capacity, and the like) and may store the divided result. Furthermore, the SOC change rate may also be divided into a plurality of types (C1 type, C2 type, C3 type to Cn type, and the like) indicating similar patterns in which the degree of reduction during the update is within a specific range.

As such, the SOC change rate grouping device 140 may generate a SOC change rate, which occurs during an update using an OTA service in a vehicle having a specific vehicle information type and a specific battery information type, as a SOC change rate pattern of each group, by matching and grouping the divided vehicle information type, the divided battery information type, and the divided SOC change rate type.

As such, such the generated SOC change rate pattern may be generated based on the SOC change rate that occurs while each controller is updated using the OTA service in the vehicle driving in an actual road. Accordingly, the SOC change rate pattern that occurs in another vehicle having vehicle information and battery information of a type similar to that of the corresponding vehicle may be applied with higher similarity.

At this time, the SOC change rate grouping device 140 may first generate an event group based on the number, types, and update order of controllers that are sequentially updated through a single update process. Besides, as well as the SOC change rate pattern for each event that occurs when a plurality of controllers are sequentially updated for each event group, a SOC change rate pattern for each controller that belongs to each event may also be generated.

Figure 5:
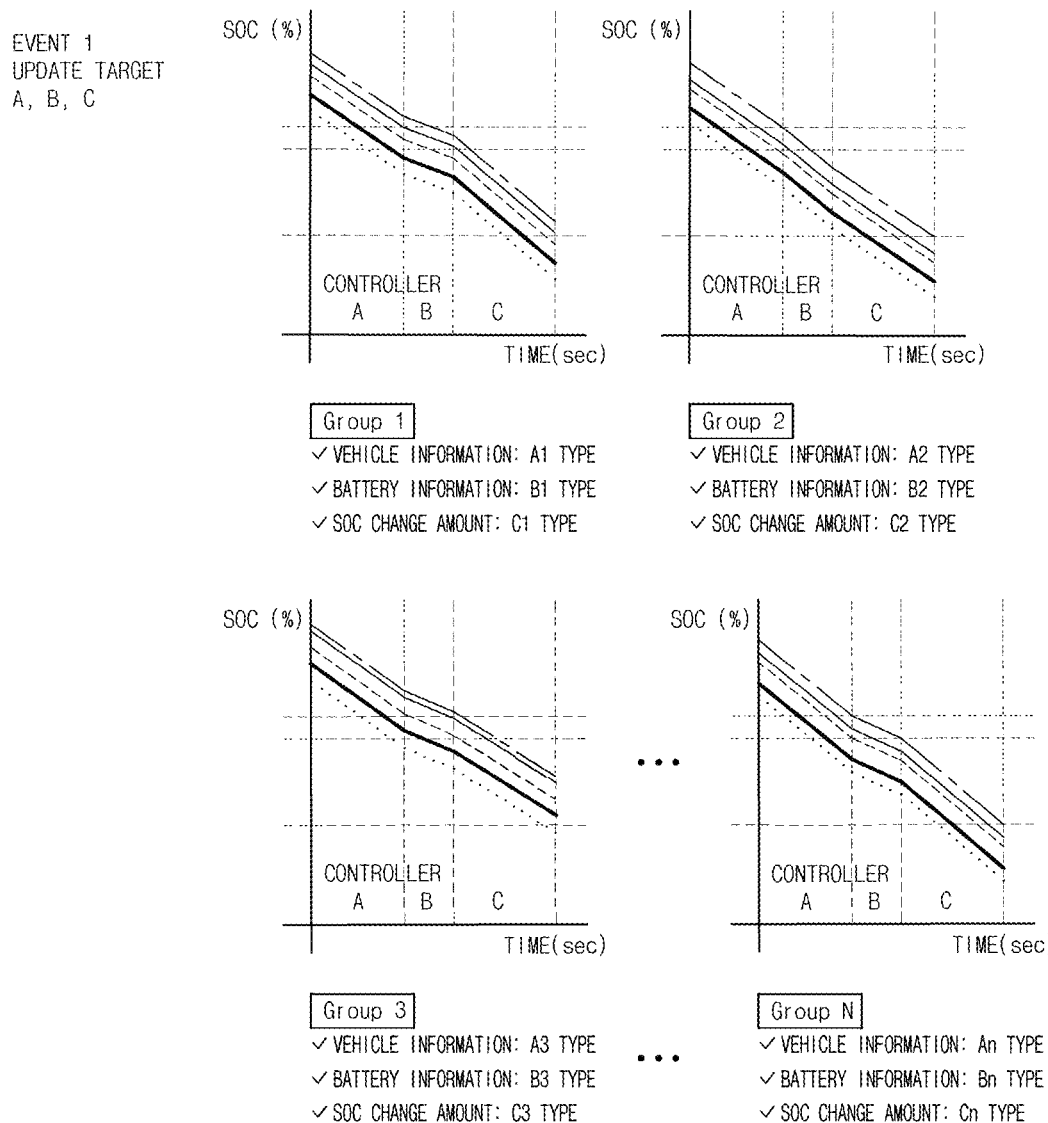
FIG. 5 is a diagram of SOC change rate grouping according to an embodiment of the present disclosure.

As such, FIG. 5 is a graph illustrating SOC change rate patterns of several groups generated by integrating the vehicle information, the battery information, and the SOC change rate through the SOC change rate grouping device.

FIG. 5 illustrates an SOC change rate pattern (in each graph, a SOC pattern is expressed in bold as compared to other lines) capable of being generated depending on a vehicle information type and a battery information type in a case of event 1 group, in which controllers A, B, and C are updated, together with example graphs for each group (Group 1, Group 2, and Group 3 to Group N). At this time, in addition to event 1 group illustrated in FIG. 5, it is natural that a plurality of groups are capable of being generated even within event 2 group in which controllers B, C, D, and E disclosed in FIG. 4B are updated. A plurality of groups are capable of being generated even within event N group in which controllers B and C are updated.

FIG. 5 illustrates all of the vehicle information, the battery information, and the SOC change rate of each group are implemented in different types (A1 B1 C1 type, A2 B2 C2 type, A3 B3 C3 type, . . . , An Bn Cn type, and the like), but are not limited thereto. A group that has the same vehicle information type and the same battery information type and has only the different SOC change rate type may be generated. A group that has a type, in which at least one of the vehicle information type or the battery information type is different and has the same SOC change rate may also be generated.

Moreover, the SOC change rate pattern generated by the SOC change rate grouping device 140 refers to a SOC reduction rate while the update is in progress. Thus, initial SOC values at a point in time when updates are started may be different from one another. Accordingly, in FIG. 5, all dotted lines or thin straight lines, each of which has the different location of an SOC start point and decreases with a similar pattern, are illustrated in addition to the SOC change rate pattern expressed in bold in each group.

Moreover, the OTA management server 100 may further include an optimal pattern suggesting device 150 that extracts, from a database, one group among groups belonging to an event having the highest similarity with an event for updating controllers by using an OTA service, and then provides the CCU with the SOC change rate pattern matched to the one group as an optimal pattern that is a criterion for determining whether to start the update in the vehicle.

At this time, first of all, the optimal pattern suggesting device 150 may select an event group for extracting an optimal SOC change rate pattern by determining whether an update event using the OTA service is similar to each event, based on the number, types, and update order of controllers belonging to each event.

As such, the optimal pattern suggesting device 150 may specify a group based on the vehicle information type and the battery information type of the corresponding vehicle within the selected event group. The optimal pattern suggesting device 150 then may extract the SOC change rate pattern matched to the specified group as an optimal pattern for determining whether to start an update in the corresponding vehicle to provide the optimal pattern to the CCU 200.

Also, the optimal pattern suggesting device 150 may derive an actual SOC change rate by receiving changes in SOC values respectively measured before and after the update of each controller belonging to the corresponding update event from the CCU 200. The optimal pattern suggesting device 150 may also re-specify a group indicating a pattern most similar to a pattern of the derived actual SOC change rate. The optimal pattern suggesting device 150 may also re-extract the SOC change rate pattern matched to the group as an optimal pattern for determining whether to continue the update and may provide the optimal pattern to the CCU 200.

The CCU 200 may include an SOC change rate pattern applying device 210 that receives an SOC change rate pattern transmitted by the OTA management server 100 to calculate the degree of SOC, which is reduced until the update event is completed, depending on the SOC change rate pattern and compares the calculated remaining SOC value with a reference SOC value to determine whether to perform the update.

At this time, the SOC change rate pattern applying device 210 may receive, from the optimal pattern suggesting device 150 of the OTA management server, an SOC change rate pattern matched to a group having a high similarity with an update event to be performed and a high similarity with a vehicle information type and a battery information type of the corresponding vehicle. Accordingly, the accuracy of determination about the degree of SOC reduction of a battery may be improved while the update event is being performed.

The SOC change rate pattern applying device 210 may calculate a remaining SOC value that remains at the end of the update when the remaining SOC value decreases with a change rate on the pattern, by matching a current SOC value obtained from the battery sensor 300 to an SOC change rate pattern.

As such, the calculated remaining SOC value may be compared with the reference SOC value required to perform basic functions of a vehicle. When the remaining SOC value is greater than the reference SOC value, it may be determined that the update is performed. Otherwise, the execution of the update may be suspended. Accordingly, it may be determined whether to perform the update.

Figure 6:
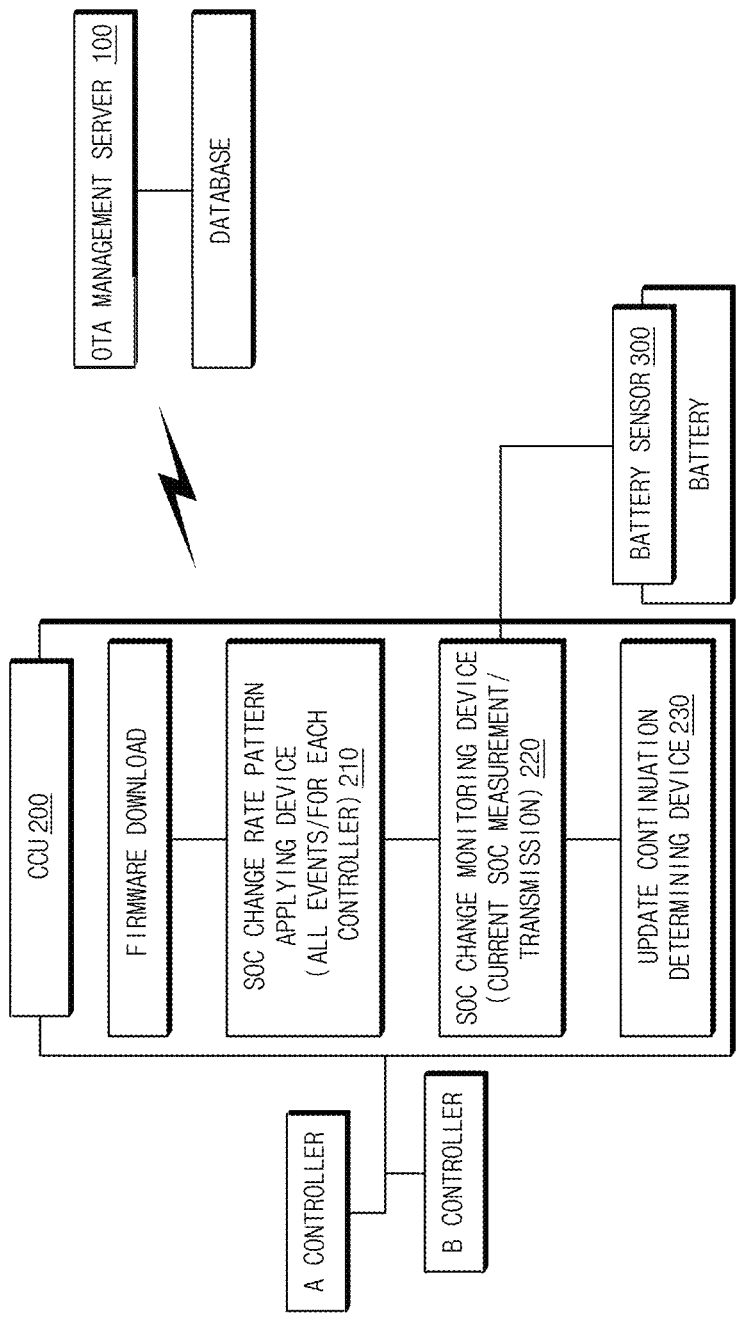
FIG. 6 is a detailed block diagram of a CCU according to an embodiment of the present disclosure.

Moreover, as illustrated in FIG. 6, the CCU 200 may further include an SOC change monitoring device 220 that receives SOC values, which are respectively measured before and after the update of each controller on the update event to be performed when it is determined to perform the update, from the battery sensor and then transmits the SOC values to the OTA management server.

The SOC change monitoring device 220 may transmit, to the OTA management server 100, the SOC values, which are respectively measured before and after the update of each controller, as basic data for re-extracting the SOC change rate pattern for predicting the remaining SOC value that remains after decreasing during the update event.

Accordingly, the optimal pattern suggesting device 150 of the OTA management server may re-select a group indicating the most similar change rate pattern based on a change in the actual SOC value reduced during the update of each controller. The optimal pattern suggesting device 150 may also provide the SOC change rate pattern matched to the selected group as an optimal pattern for determining whether to continue the update.

Besides, the CCU 200 may further include an update continuation determining device 230 that re-calculates a degree of SOC, which is reduced until all the remaining controllers belonging to the update event are updated, as a new optimal pattern through the received SOC change rate pattern, compares the re-calculated remaining SOC value with the reference SOC value again, and determines whether to continue the update.

The update continuation determining device 230 may compare the re-calculated remaining SOC value with the reference SOC value again. When the remaining SOC value is greater than the reference SOC value, the update continuation determining device 230 may continue the update. Otherwise, the update continuation determining device 230 may suspend the execution of the update. Accordingly, the update continuation determining device 230 may continue to maintain the remaining SOC value of the battery so as to be greater than or equal to an appropriate level regardless of whether to continue the update.

As such, the update continuation determining device 230 may determine whether to proceed with an update by primarily predicting the degree of SOC reduction, which occurs during the update in the corresponding vehicle through the type of an update event and vehicle information and battery information, through the SOC change rate pattern extracted by the OTA management server. After the update is started, the update continuation determining device 230 may measure the degree of SOC reduction that actually occurs and may secondarily correct and predict the degree of SOC reduction through the SOC change rate pattern matched to a new group indicating the most similar pattern based on the measured degree of SOC reduction.

Accordingly, when the remaining SOC value calculated using the SOC change rate pattern of group 1 (Group 1) provided from the OTA management server 100 exceeds the reference SOC value upon performing an update event in which controllers A, B, and C are updated, the first controller A may be updated and the SOC change monitoring device 220 may measure SOC values respectively before and after controller A is updated and then may transmit the SOC values to the OTA management server 100.

Afterward, when it is determined that a change pattern of an SOC value generated when controller A is updated is more similar to a change pattern when controller A in group 2 (Group 2) is updated, the optimal pattern suggesting device 150 of the OTA management server may re-extract an SOC change rate pattern matched to group 2 (Group 2) as an optimal pattern for determining whether to continue the update and may provide the optimal pattern to the CCU 200.

Furthermore, the update continuation determining device 230 may re-calculate a remaining SOC value when the updates of controller B and controller C are completed, based on a current SOC value in the state where the update of controller A is completed, by using the SOC change rate pattern extracted again as a new optimal pattern. The update continuation determining device 230 may determine whether to continue the update by comparing the re-calculated remaining SOC value with the reference SOC value again.

Afterward, when the update of controller A has been completed even after the update of controller B is completed, the SOC change monitoring device 220 may transmit, to the OTA management server 100, SOC values respectively before and after controller B is updated. The optimal pattern suggesting device 150 of the OTA management server may determine whether to re-extract the SOC change rate pattern based on the SOC values.

As described above, the update continuation determining device 230 receiving the SOC change rate pattern re-extracted by the optimal pattern suggesting device 150 may determine whether to continue the update, by re-calculating the remaining SOC value depending on the SOC change rate pattern.

While this process is repeated, the update continuation determining device 230 may accurately predict the remaining SOC value after the update using the OTA service is completed. Accordingly, it is possible to prevent the remaining SOC value from falling below the reference SOC value during the update process. Thus, unexpected situations such as failure of update due to power cut-off during update or the lack of start-up voltage after an update is completed may be prevented.

It is possible to increase the success rate of controller update using the OTA service without unnecessarily setting a large margin, by calculating the remaining SOC value more accurately. Besides, the update may be started even when a current SOC value of a battery reaches a specific level. Thus, the performance rate of the update may be increased.

Next, an update control method of a vehicle controller according to another embodiment of the present disclosure is described with reference to FIGS. 7 and 8.

Figure 7:
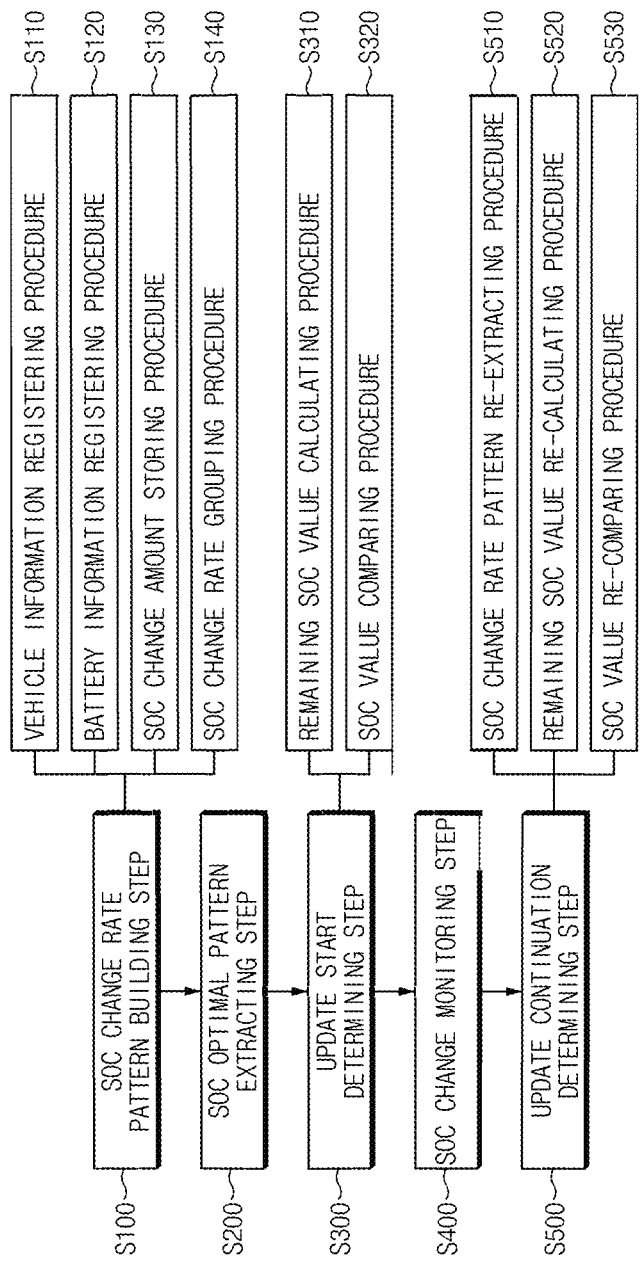
FIG. 7 is a block diagram of an update control method of a vehicle controller according to another embodiment of the present disclosure.

FIG. 7 is a block diagram of an update control method of a vehicle controller according to another embodiment of the present disclosure. FIG. 8 is a flowchart illustrating an update process of a vehicle controller according to another embodiment of the present disclosure.

Figure 8:
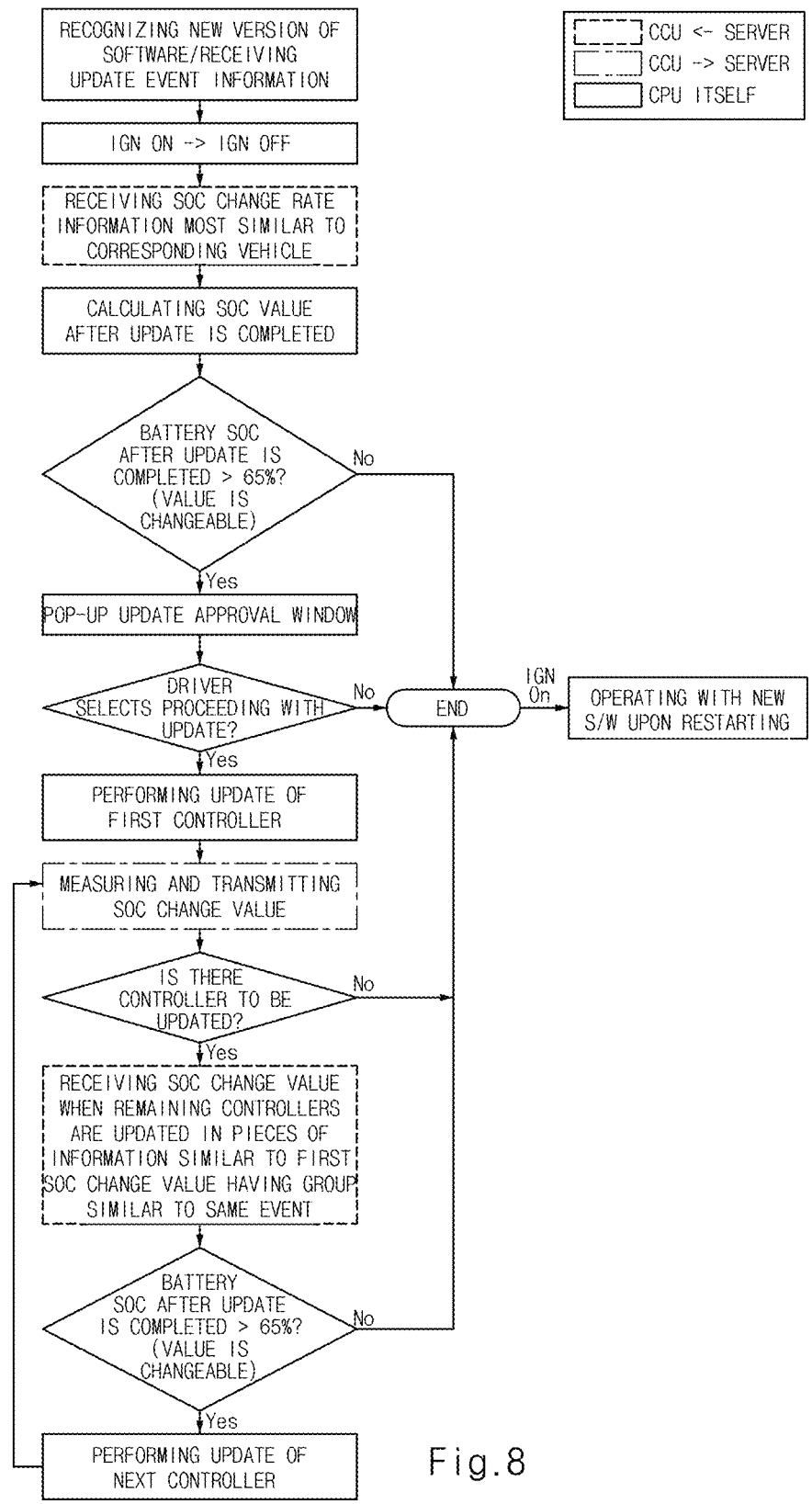
FIG. 8 is a flowchart illustrating an update process of a vehicle controller according to another embodiment of the present disclosure.

Referring to FIGS. 7 and 8, the update control method of a vehicle controller according to another embodiment of the present disclosure may include a SOC change rate pattern building step S100, a SOC optimal pattern extracting step S200, and an update start determining step S300. The SOC change rate pattern building step S100 may include collecting a SOC value changed depending on the power consumed upon updating a controller by using an OTA service in each vehicle and then grouping vehicle information and battery information, which indicate a similar SOC change rate to store the grouped result in a database of an OTA management server. The SOC optimal pattern extracting step S200 may include extracting an SOC change rate pattern of a group, which has a type similar to that of a vehicle to be updated and that of a battery mounted in the vehicle, as an optimal pattern for calculating an SOC reduction expected value when an update event occurs. The update start determining step S300 may include determining whether to update a controller and proceeding with the update after calculating, by a CCU of each vehicle receiving the SOC change rate pattern, a remaining SOC value after an update is completed.

The SOC change rate pattern building step S100 may include a vehicle information registering procedure S110, a battery information registering procedure S120, and a SOC change amount storing procedure S130. The vehicle information registering procedure S110 may include a step of collecting vehicle information from the CCU installed in each vehicle and storing the vehicle information in a database. The battery information registering procedure S120 may include a step of collecting information about a battery mounted in each vehicle receiving vehicle information and storing the battery information in the database. The SOC change amount storing procedure S130 may include a step of accumulating and storing a SOC value for grasping the consumption level of a battery, which has been consumed upon updating a controller by using the OTA service in each vehicle receiving the battery information, collecting a SOC change rate changed over time, and storing the SOC change rate in the database.

At this time, the vehicle information registering procedure S110 may include a step of collecting and storing data for determining whether a vehicle is aging and data regarding important factors affecting consumption of a battery, such as VIN of each vehicle actually being driven on a road by users, a specification of a controller, a distance driven of each vehicle, driving habits (a duration per trip, an average number of trips per week, or the like) from the CCU of each vehicle.

Moreover, the battery information registering procedure S120 may include a step of collecting and storing data for grasping the basic performance and aging of the battery, such as a maker, type, production date, and capacity of a battery installed in each vehicle, from the CCU of each vehicle.

Moreover, the SOC change amount storing procedure S130 may include a step of receiving, from the CCU, an SOC value obtained through a battery sensor provided in each battery while a controller is being updated using the OTA service, storing the SOC value cumulatively in the database, generating a change graph indicating a degree of SOC reduced as each controller is being updated, and storing the change graph in the database.

As such, the change graph indicating the degree of SOC reduction may be generated in the SOC change amount storing procedure S130, and thus the SOC change rate continuously generated while each controller is updated or while a plurality of controllers are sequentially updated may be derived by the slope of the change graph.

Also, the SOC change rate pattern building step S100 may further include an SOC change rate grouping procedure S140. The SOC change rate grouping procedure S140 may include a step of integrally matching the SOC change rate with vehicle information and battery information, grouping together a vehicle information type and a battery information type that indicate a similar SOC change rate pattern, and storing the grouped result in a database.

As such, the SOC change rate grouping procedure S140 may include a step of generating the SOC change rate, which is generated during an update in a vehicle having a specific vehicle information type and a specific battery information type, as an SOC change rate pattern of each group, by matching and grouping a plurality of vehicle information types, battery information types, and SOC change rate types that have identical or similar conditions to one another.

Moreover, the SOC optimal pattern extracting step S200 may include a step of extracting one group among the event groups with high similarity with an event to be updated using the OTA service from the database and then providing a SOC change rate pattern matched to the extracted one group as an optimal pattern, which is a criterion for determining whether to start the update in the corresponding vehicle, to the CCU, when an update event for a controller occurs.

At this time, as illustrated in FIG. 8, in the SOC optimal pattern extracting step S200, first of all, when a new version of a controller's software (S/W) is recognized, the OTA management server may receive information about a new update event to be performed from a vehicle control center. The OTA management server may also determine whether the new update event is similar to an update event of the event group stored in the database, based on the number, types, and update order of controllers belonging to each event. The OTA management server may also select an event group for extracting the SOC change rate pattern.

Furthermore, a group may be specified based on the vehicle information type and the battery information type of the corresponding vehicle within the selected event group. The SOC change rate pattern matched to the specified group may be extracted as an optimal pattern for the corresponding vehicle to provide the optimal pattern to the CCU 200.

The update start determining step S300 may include a remaining SOC value calculating procedure S310 and an SOC value comparing procedure S320. The remaining SOC value calculating procedure S310 may include a step of applying a current SOC value obtained from a battery sensor to the SOC change rate pattern received from the OTA management server and calculating the remaining SOC value, which is an expected value to be decreased until an update event is completed. The SOC value comparing procedure S320 may include a step of comparing the calculated remaining SOC value with the reference SOC value to determine whether to perform the update.

To the end, in the remaining SOC value calculating procedure S310, the CCU that receives a SOC change rate pattern from the OTA management server may substitute the current SOC value obtained from the battery sensor for the SOC value before a controller is updated on the SOC change rate pattern. The CCU may also calculate the remaining SOC value, which is an expected value when being decreases until the update event ends with a slope on the corresponding SOC change rate pattern.

Furthermore, in the SOC value comparing procedure S320, the remaining SOC value calculated using the SOC change rate pattern may be compared with the reference SOC value required to perform basic functions of a vehicle. When the remaining SOC value is greater than the reference SOC value, the update may be performed. Otherwise, the execution of the update may be suspended. Accordingly, it may be determined whether to perform the update.

As such, in an embodiment in which the update start determining step is executed, in FIG. 8, when the remaining SOC value, which is the battery SOC after an update is completed, is greater than 65% of the maximum charge value, it is possible to display an update approval window through the audio video navigation (AVN) of a vehicle by determining to proceed with the update. Accordingly, it is indicated that a driver selects whether to proceed with the update. It is natural that the reference SOC value being 65% of the maximum charging value shown in the embodiment is changeable.

Afterward, it is natural that the driver is capable of terminating the update without proceeding with the update. However, when the driver selects proceeding with the update, the update may be performed while the software (S/W) for the first controller among controllers to be updated, which belong to the update event, is received from the OTA management server.

Moreover, the update control method of a vehicle controller according to an embodiment of the present disclosure may further include a SOC change monitoring step S400. The SOC change monitoring step S400 may include a step of receiving SOC values respectively measured before and after the update from a battery sensor after the update of each controller belonging to an update event is in progress and transmitting the SOC values to the OTA management server.

As such, it is possible to determine whether the SOC change rate pattern transmitted in the SOC optimal pattern extracting step is appropriate, by transmitting the SOC values respectively measured before and after update of each controller in the SOC change monitoring step S400 to the OTA management server. Besides, it is natural that the OTA management server is capable of accumulating and storing received SOC values before and after an update as data for correcting and supplementing the SOC change amount pattern in a database.

Moreover, the update control method of a vehicle controller according to an embodiment of the present disclosure may further include an update continuation determining step S500. The update continuation determining step S500 may include a step of determining whether to continue the update, based on the SOC change rate pattern that is re-extracted based on the actual SOC change rate derived from the SOC value obtained in the SOC change monitoring step after it is determined whether there is a controller to be updated.

The update continuation determining step S500 may include an SOC change rate pattern re-extracting procedure S510 that re-selects a group indicating the SOC change rate most similar to an actual SOC change rate calculated based on SOC values respectively measured before and after the update of a controller in the corresponding event group with respect to the corresponding controller. In step S510, the SOC change rate pattern matched to the re-selected group is presented as an optimal pattern for re-calculating an expected value of the remaining SOC value.

At this time, in the SOC change rate pattern re-extracting procedure S510, it is possible to compare SOC change rates for the same controller with each other and to determine whether the SOC change rates are similar to each other. Moreover, an expected value of the remaining SOC value re-calculated afterward needs to become a value at a point in time when all update events to be performed are completed. The SOC change rate pattern needs to be re-extracted within an event group with the highest similarity such as the number, types, and order of controllers included in the update event. Accordingly, it is natural that the re-extracted SOC change rate pattern is the same as an existing SOC change rate pattern.

Moreover, the update continuation determining step S500 may include a remaining SOC value re-calculating procedure S520 and an SOC value re-comparing procedure S530. The remaining SOC value re-calculating procedure S520 may include a step of applying a SOC value after the update of a controller to the re-extracted SOC change rate pattern to re-calculate an expected value of the remaining SOC value when the updates of the remaining controllers are completed. The SOC value re-comparing procedure S530 may include a step of comparing the re-calculated remaining SOC value with a reference SOC value to determine whether to continue updating the remaining controllers.

To the end, the remaining SOC value re-calculating procedure S520 may include a step of matching the latest SOC value obtained in the SOC change monitoring step on the re-extracted SOC change rate pattern received from the OTA management server in the CCU and recalculating the remaining SOC value. The remaining SOC value is an expected value when decreasing with a slope on the SOC change rate pattern until updates of the remaining controllers are completed.

Moreover, in the SOC value re-comparing procedure S530, the re-calculated remaining SOC value may be compared with a reference SOC value. When the re-calculated remaining SOC value is still greater than the reference SOC value, an update of the next controller is in progress by continuing the update. Otherwise, the progress of the update may be stopped. Accordingly, it is possible to determine whether to continue the update event.

As such, the present disclosure may extract a SOC change rate pattern estimated to be most suitable for the corresponding update event and vehicle after the update event occurs. The present disclosure may also provide the extracted SOC change rate pattern as an optimal pattern for calculating an expected value of the remaining SOC value. After the updates of some controllers belonging to the corresponding update event is completed, the present disclosure may re-extract a SOC change rate pattern indicating a change rate most similar to an actual SOC change rate depending on SOC values respectively measured before and after the update. Whether to continue updating the remaining controllers in the future may be determined based on the remaining SOC value predicted by using the re-extracted SOC change rate pattern. The present disclosure may improve the accuracy of calculating an expected value for a remaining SOC value calculated while updates of controllers belonging to an update event is in progress.

Accordingly, the success rate of the update may be improved without setting too much margin upon calculating the remaining SOC value. In addition, an appropriate remaining SOC value may be predicted within a range that is not excessive and is capable of being reduced during the update. Thus, the update performance rate may be increased.

Hereinabove, although the present disclosure has been described with reference to embodiments and the accompanying drawings, the present disclosure is not limited thereto. The present disclosure may be variously modified and altered by those having ordinary skill in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of protection of the present disclosure should be construed by the attached claims and all equivalents thereof should be construed as being included within the scope of the present disclosure.

The present disclosure may improve the success rate of controller update because it is possible to prevent an update from being interrupted due to an unexpected sudden decrease in SOC such as battery aging while a controller is being updated using an OTA service, by accurately calculating an expected value of a remaining SOC value by the SOC change rate pattern extracted from an OTA management server.

Moreover, it is possible to accurately calculate the expected value of a remaining SOC value, and thus there is no need to unnecessarily set a large margin. Accordingly, the present disclosure may improve the performance rate of the update because the update is capable of being performed even when the battery is a little bad (when a battery is aging, or when a remaining SOC is low).

Besides, a variety of effects directly or indirectly understood through the specification may be provided.

What is claimed is:

1. An update system of a vehicle controller, the system comprising:
   an over-the-air (OTA) management server configured to
      acquire a state of charge (SOC) change rate when the vehicle controller is updated,
      classify vehicles having the SOC change rate below a threshold into a same group,
      match a vehicle information and a battery information to the SOC change rate for each group,
      select, as a reference group, a group having a largest number of the vehicle information and the battery information matching the vehicle information and the battery information of a target vehicle having the vehicle controller to be updated, and
      extract the SOC change rate of the reference group; and
   a communication control unit (CCU) configured to
      substitute a current SOC value obtained from a battery sensor to the SOC change rate of the reference group,
      calculate a remaining SOC value, which is an expected value to be reduced until an update event is completed with a slope on a corresponding SOC change rate, and
      update the vehicle controller,
   wherein the vehicle information includes a vehicle identification number (VIN) of each the vehicle, a specification of a controller, a distance driven of each vehicle, a duration per trip, and an average number of trips per week from the CCU of each vehicle, and
   wherein the battery information includes a maker, type, production date, and capacity of a battery installed in each vehicle.

2. The system of claim 1, further comprising:
   a battery sensor connected to a battery of a vehicle and configured to measure an SOC value of the battery changed upon updating the controller using an OTA service provided by the CCU and to transmit the measured SOC value to the CCU.

3. The system of claim 1, wherein the OTA management server is configured to:
   collect and store the vehicle information from the CCU provided in a vehicle;
   collect and store information about a battery installed in each vehicle receiving the vehicle information;
   collect a SOC value measured before and after an update of each controller by an OTA service in each vehicle receiving the battery information; and
   generate and store a SOC change rate indicating a reduction degree of a SOC reduced as each controller is being updated.

4. The system of claim 1, wherein the OTA management server is further configured to:
   classify the vehicles with matching event information less than or equal to a preset number into a same event group;
   select, as a reference event group, an event group that matches a largest number of event information numbers of the target vehicle;
   specify the reference group based on a vehicle information type and a battery information type of a corresponding vehicle within the selected event group;
   extract the SOC change rate of the reference group for determining whether to start the update in the corresponding vehicle; and
   provide the SOC change rate to the CCU.

5. The system of claim 1, wherein the OTA management server is further configured to:
   derive an actual SOC change rate by receiving a change in the SOC value measured before and after the update of each controller belonging to a corresponding update event from the CCU;
   select, as another reference group, a group having a smallest SOC change rate deviation from the actual SOC change rate; and
   provide the SOC change rate of the another reference group to the CCU for determining whether to continue the update.

6. The system of claim 1, wherein the CCU is configured to:

compare the remaining SOC value with a reference SOC value; and determine whether to perform an update.

7. The system of claim 6, wherein the CCU is further configured to:

receive, from a battery sensor, the SOC value measured before and after the update of each controller on the update event to be performed when it is determined to perform the update; and transmit the SOC value measured before and after the update of each controller to the OTA management server.

8. The system of claim 7, wherein the CCU is further configured to:

acquire a measured SOC change rate from the SOC value measured until all the remaining controllers belonging to the update event are updated;

calculate the remaining SOC based on the SOC change rate;

compare the remaining SOC with the reference SOC value again; and determine whether to continue the update.

9. An update control method of a vehicle controller, the method comprising:

acquiring, by an over-the-air (OTA) management server, a state of charge (SOC) change rate when the vehicle controller is updated;

classifying, by the OTA management sever, vehicles having the SOC change rate below a threshold into a same group;

matching, by the OTA management sever, a vehicle information and battery information to the SOC change rate for each group;

selecting, by the OTA management sever, as a reference group, a group having a largest number of matching the vehicle information and the battery information of a target vehicle to be updated from among the groups;

extracting, by the OTA management sever, the SOC change rate of the reference group;

calculating, by a CCU, a remaining SOC value after an update is completed with a slope on a corresponding SOC change rate;

determining, by the CCU, whether to update the vehicle controller; and proceeding, by the CCU, with an update, wherein the vehicle information includes a vehicle identification number (VIN) of each the vehicle, a specification of a controller, a distance driven of each vehicle, a duration per trip, and an average number of trips per week from the CCU of each vehicle, and wherein the battery information includes a maker, type, production date, and capacity of a battery installed in each vehicle.

10. The method of claim 9, wherein the calculating of the remaining SOC value further comprises:

substituting a current SOC value obtained from a battery sensor to the SOC change rate of the reference group;

calculating the remaining SOC value, which is an expected value to be reduced until an update event is completed with a slope on the corresponding SOC change rate; and comparing the calculated remaining SOC value with a reference SOC value to determine whether to perform the update.

11. The method of claim 9, further comprising:

receiving, from a battery sensor, the SOC value measured before and after the update of each controller to transmit the SOC value to the OTA management server when it is determined, in the proceeding with the update, that the update is performed, and then each controller belonging to an update event is updated.

12. The method of claim 11, further comprising:

transmitting the SOC value before and after the update of each controller to the OTA server in the receiving of the SOC value measured before and after the update;

determining whether there is a controller to be updated; and determining whether to continue the update, depending on the SOC change rate that is re-extracted based on an actual SOC change rate derived from the SOC value obtained in the receiving of the SOC value measured before and after the update.

13. The method of claim 12, wherein the determining of whether to continue the update comprises:

selecting, as another reference group, a group having a smallest SOC change rate deviation from the actual SOC change rate calculated based on the SOC value measured before and after the update of the controller in a corresponding event group with respect to a corresponding controller; and presenting the SOC change rate of the another reference group.

14. The method of claim 12, wherein the determining of whether to continue the update further comprises:

applying a SOC value after the update of the controller to the SOC change rate of the another reference group to re-calculate an expected value of the remaining SOC value when updates of the remaining controllers are completed; and comparing the re-calculated remaining SOC value with the reference SOC value to determine whether to continue updating the remaining controllers.

* * * * *